Aug. 14, 1951   J. B. PARSONS   2,564,446
REAR FLAP OPERATOR FOR CONVERTIBLE TOPS
Filed Sept. 29, 1948   3 Sheets-Sheet 1
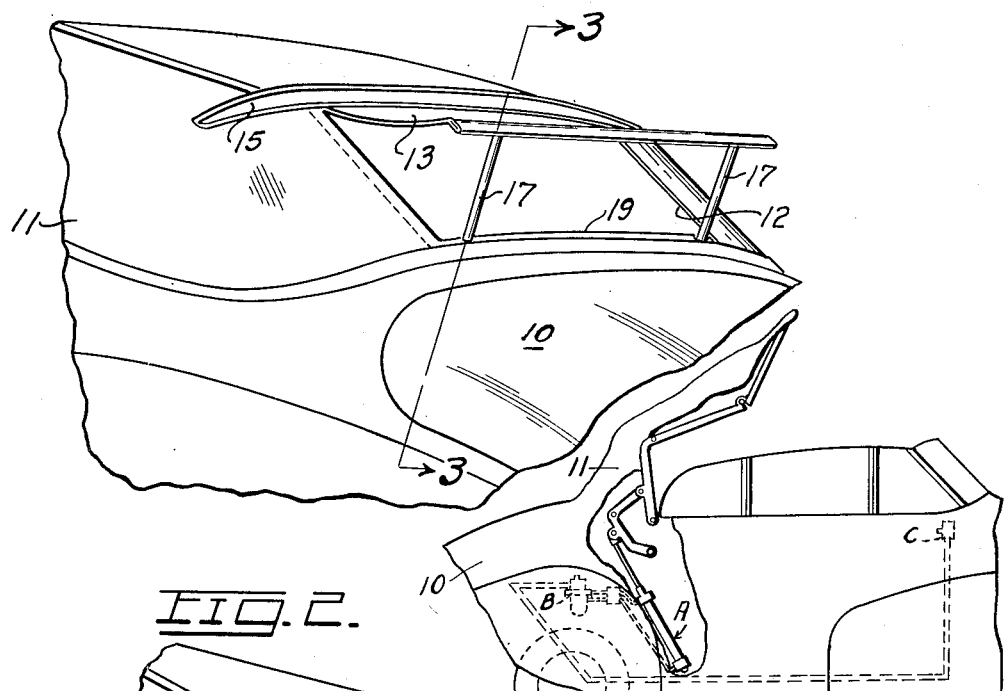
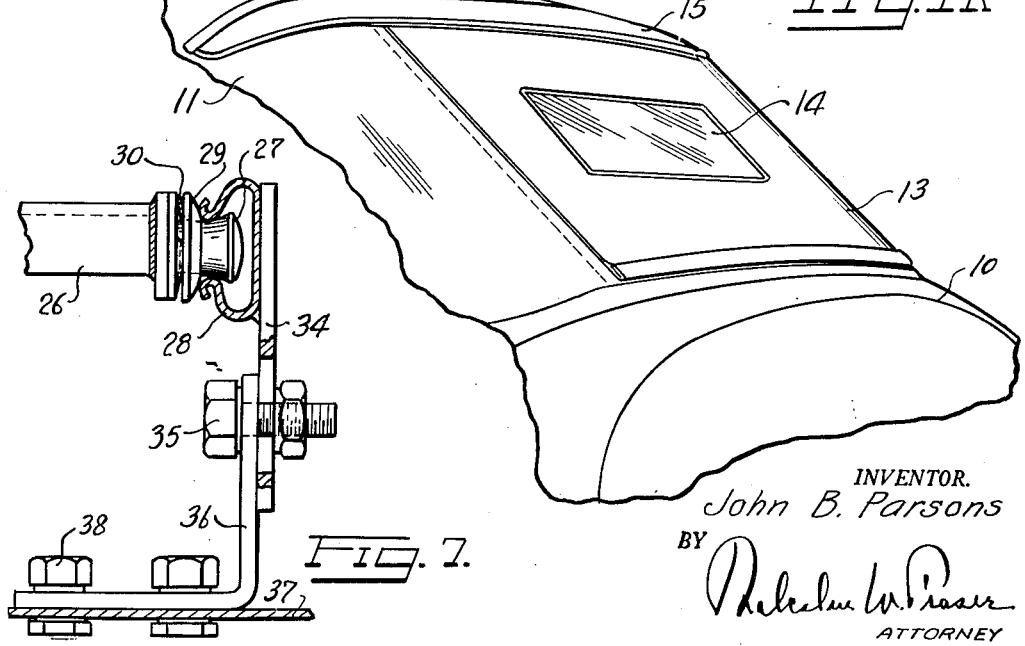
INVENTOR.
John B. Parsons
BY
ATTORNEY

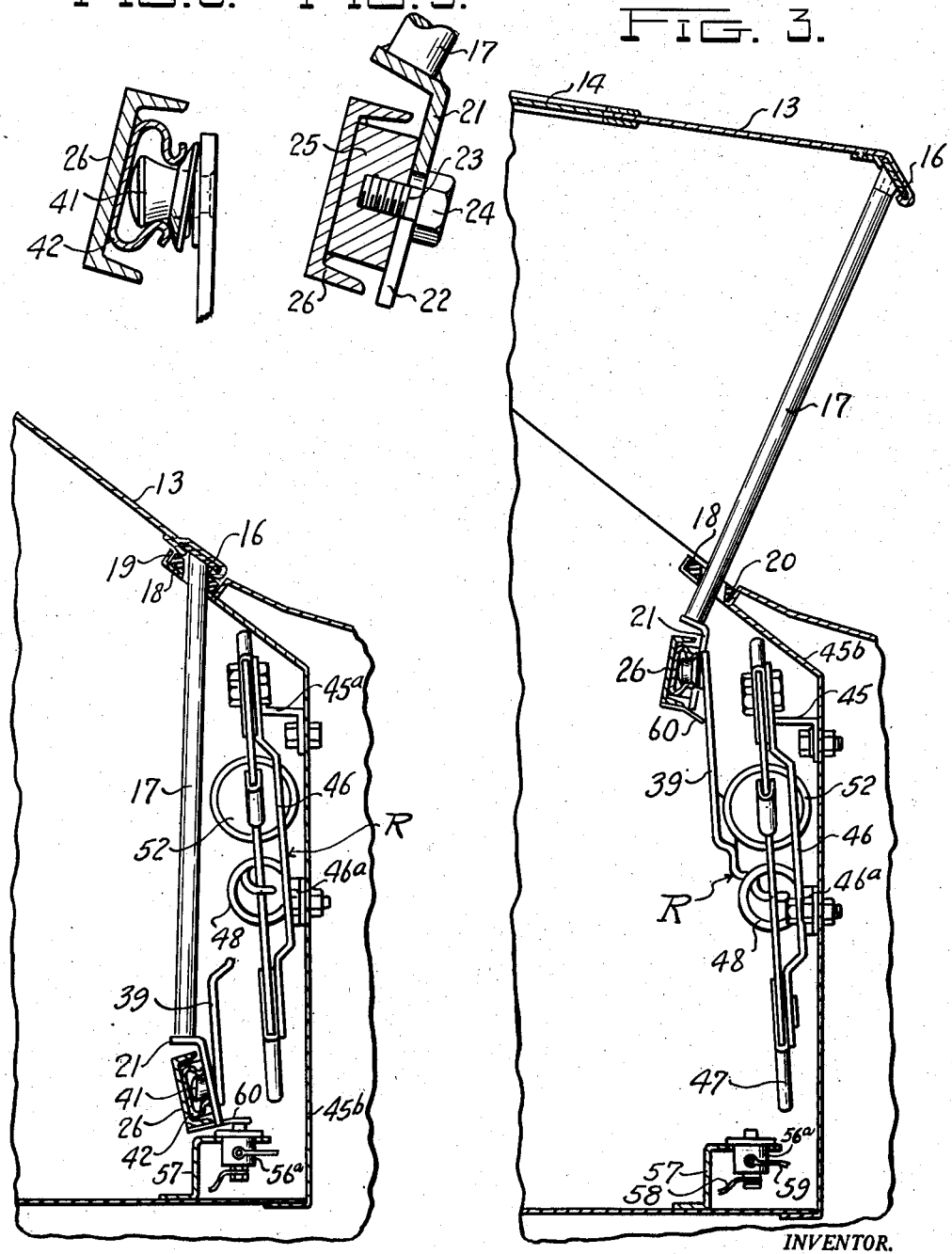

Aug. 14, 1951  J. B. PARSONS  2,564,446
REAR FLAP OPERATOR FOR CONVERTIBLE TOPS
Filed Sept. 29, 1948  3 Sheets-Sheet 3
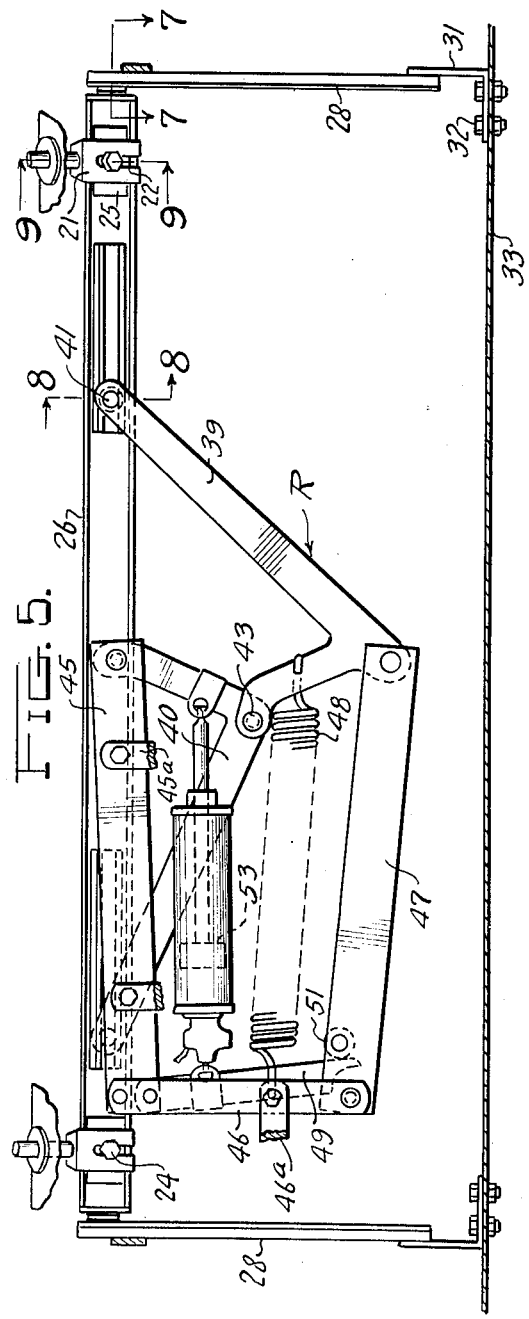
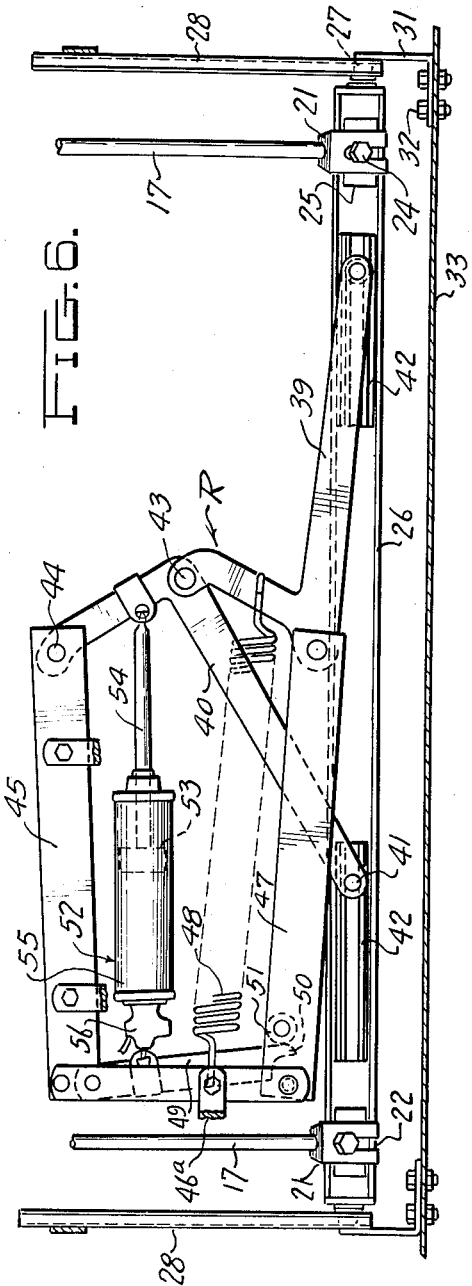
INVENTOR.
John B. Parsons
BY
ATTORNEY Patented Aug. 14, 1951

2,564,446

UNITED STATES PATENT OFFICE 2,564,446

REAR FLAP OPERATOR FOR
CONVERTIBLE TOPS

John B. Parsons, Maumee, Ohio

Application September 29, 1948, Serial No. 51,821

5 Claims. (Cl. 296—138)

This invention relates to automobile body structures, but particularly to the ventilation of the interior thereof, and is particularly, although not essentially, useful in connection with convertible automobile bodies.

An object is to provide automobiles with a hingedly mounted panel at the rear end which can be swung from a closed position to an open position so that not only is the interior of the automobile satisfactorily and comfortably ventilated while the vehicle is in motion, but also to increase the rear visibility.

Another object is to produce a hingedly mounted panel or flap as above indicated at the rear of the automobile body and automatic mechanism for actuating the same to its open and closed positions, the same being controlled at a remote point such as at a place convenient to the driver.

Another object is to provide a convertible automobile top of the usual flexible fabric structure and which can be swung from an open position to a raised or closed position, with a rear flap which can be swung upwardly and outwardly or lowered into intimate contact with the adjacent top structure.

A still further object is to produce an adjustable rear flap of the above type for the rear of a convertible automobile and operating mechanism therefor which militates against the raising and lowering movements of the top unless and until the rear flap is in its lowered or closed position, thereby obviating damage to the structure while lowering the top when the rear flap was in its raised or open position.

For purposes of illustration but not of limitation, an embodiment of the invention is shown in the accompanying drawings, in which Figure 1 is a rear perspective view of a portion of a convertible automobile showing the ventilating flap in raised or open position;

Figure 1A is a side elevation of a portion of a convertible automobile showing the top in its partially closed position and the power means operating the top;

Figure 2 is a perspective view of a convertible automobile similar to Figure 1, but showing the flap in its closed position;

Figure 3 is an enlarged sectional view substantially on the line 3—3 of Figure 1;

Figure 4 is a vertical sectional elevation similar to Figure 3 but showing the flap and operating mechanism therefor when the flap is in closed position;

Figure 5 is a longitudinal elevational view of the flap operating mechanism and showing the position of the parts when the flap is in its fully raised or open position;

Figure 6 is an elevational view of the mechanism shown in Figure 5, but showing the position of the parts when the flap is in its closed position;

Figure 7 is an enlarged sectional view substantially on the line 7—7 of Figure 5;

Figure 8 is an enlarged sectional view substantially on the line 8—8 of Figure 5; and Figure 9 is an enlarged sectional view on the line 9—9 of Figure 5.

The illustrated embodiment of the invention comprises an automobile body 10 of the convertible type having a flexible fabric top 11 of the usual or well-known type supported by suitable bows and when in its raised or closed position, is latched in position at the top of the windshield frame (not shown), the side portions of the top being usually attached to the body by the usual snap fasteners (not shown). When not in use or when it is desired to dispense with the top, it may be unlatched, the side fasteners disconnected, and folded rearwardly into a compact position at the rear portion of the body. Not infrequently, convertible tops are power-operated to and from their position of use. Reference is hereby made to my United States Patent 2,346,387, dated April 11, 1944, wherein a hydraulic means for power operation is shown, the same being hydraulically operated. There it will be seen that a piston and cylinder assembly A is employed for raising and lowering the top, an electric motor driven pump B being employed for the purpose so that by manipulating a switch C, an electric motor is energized which operates a pump for forcing liquid under pressure to one side or the other of the cylinder, thereby to drive the piston in one direction or the other for effecting the desired movement of the convertible top.

At the rear of the convertible top 11 is a rectangularly shaped opening 12 which is adapted to be covered or uncovered by a flap or panel 13 which is also of flexible fabric material and has a window glass panel 14 mounted therein. The opening is of substantial size and extends substantially from the rear edge portion of the body 10 substantially to the upper surface of the convertible top to which it is connected in any suitable manner as by a reinforced sewed seam disposed beneath the shroud or concealing flap 15. This enables the flap 13 to be swung rearwardly and upwardly to reveal the opening 12 or to be swung downwardly against the adjacent side walls of the top in overlapping relation to effect a weather-tight joint. The longitudinal free edge portion of the flap 13 is folded upon a longitudinally elongated flat metal strip 16 and fixed to the inner side of the metal strip 16, as by welding, is a pair of rods 17 which are cylindrical in cross section and which, in the raised or open position of the flap 13, incline downwardly and forwardly. The rods are connected to the strip at points spaced inwardly a short distance from opposite ends of the strip 16. The rods slide through grommets 18 disposed in apertures in a laterally extending body strip 19, rubber washers 20 being disposed within the grommets to provide a satisfactory seal when the flap is in its closed position and also to provide a satisfactory guide for the rods during their reciprocatory movement. The arrangement of the rods is such that when in raised position, the strip 16 which is attached to the rods 17 is at an acute angle to the flap as indicated in Figure 3, and due to the swinging movement of the flap 13 the rods incline upwardly and rearwardly with respect to the automobile body. However, when the flap 13 is in its closed position, the strip 16 is then turned so that it is in alignment with the body of the flap and the rods 17 extend in a substantially perpendicular fashion as shown in Figure 4.

Suitably fixed as by welding to the lower end of each rod 17 is a bracket 21 of substantially L-shape, the body of which inclines downwardly and rearwardly with respect to the respective rod 17. The body or depending portion of the bracket 21 is slotted vertically as indicated at 22 and extending through each of the slots 22 is a bolt 23 having a head 24. The bolt screw-threadedly engages a block 25 which is welded to a U-shaped channel bar 26 which is of a length approximating the width of the top flap 13. The bolt and slot connection between the bracket 21 and the block 25 affords a limited adjustment between the rods 17 and the channel bar 26 to insure that opposite end portions of the flap 13 move uniformly together.

Projecting from each end of the channel bar 26 is a button or stud 27, the side walls of which taper inwardly. The studs 27 project into vertically disposed guide strips 28 which are substantially U-shaped in cross section (Figure 7). The outer ends of the studs or buttons 27 are of greater diameter than the space between the adjacent edges of the guide strip 28 and the studs are retained in place by tapered washers 29 on the studs which are urged into engagement with the outer edge portions of the guide strips by spring 30. In this manner, the studs have free sliding engagement relative to the guide strips 28 and are rattle-proof due to the spring-tensioned tapered washer. The lower ends of the guide strips 28 are rigidly secured by an angle bracket 31 which is secured by bolt and nut assemblies 32 to a vehicle body portion 33. The upper end portion of each channel strip is fixed as by welding to an arm 34 which is secured by a bolt and nut assembly 35 to an angle bracket 36 which is secured to a vehicle body portion 37 by bolt and nut assemblies 38.

It will be manifest from the above description that upward and downward movement of the channel bar 26 is guided by the vertically disposed guide strips 28 and movable conjointly with the bar 26 are the vertically disposed rods 17 which accordingly swing the flexible flap 13 to its raised or open position or to its lowered or closed position. For effecting such movement of the channel bar 26, a hydraulically operated regulator mechanism, generally indicated at R, is provided. Such regulator mechanism includes a pair of swinging bell crank arms 39 and 40 on the free ends of which are studs 41 (Figure 8) similar to the stud 27 above described and these studs are slidable horizontally in channel strips 42 which are secured, as by welding, to the channel bar 26. Each of the arms 39 and 40 is in the form of a bell crank lever having a relatively long arm, the free end of which carries the stud 41 and the short arm of the bell crank lever 39 is pivoted to the angular portion of the other bell crank lever.

The arm of the bell crank lever 40 is pivoted at 44 to a fixed stanchion or frame arm 45. The stanchion arm 45 is rigidly attached by angle brackets 45a to a vertically disposed body panel 45b. The opposite end of the stanchion arm 45 is rigidly riveted to a cross arm 46, to the opposite end of which is pivoted a stanchion arm 47. The cross arm 46 is secured by a bracket assembly 46a to the body panel 45b. The angular portion of the bell crank lever 39 is pivoted to the outer end of the stanchion arm 47.

Intermediate the short arm of the bell crank lever 39 is a helical coil spring 48, the opposite end of which is hooked over a compensating arm 49, one end of which is pivoted on one of the connecting rivets securing the stanchion arm 45 and the cross arm 46. The opposie end of the compensating arm 49 is hook-shaped as indicated at 50. Swinging movement of the compensating arm 49 in one direction is stopped by a rivet 51. Connected at one end to the compensating arm 49 is a cylinder 52 in which a piston 53 is reciprocable, the piston having a piston rod 54, the outer end of which is connected to an intermediate portion of the short arm of the bell crank 40. At the inner end of the cylinder is a solenoid controlled valve 55 and a fitting 56 through which liquid flows to and from the cylinder. The tube connection and wiring have been omitted for purposes of clarity.

Reference is hereby made to my United States Patent 2,371,183, dated March 13, 1945, and entitled "Window Regulator Mechanism," and United States Patent 2,436,728, dated February 24, 1948, and entitled "Vehicle Window Regulator," which shows a window regulator similar to the regulator structure above described. Suffice it here to say that upon admission of fluid such as liquid under pressure through the fitting 56 and through the solenoid controlled valve 55 which has previously been energized to open the valve, the piston 53 is driven to the right of the cylinder thereby to swing the bell cranks 39 and 40 to the position indicated in Figure 6, whereby the flap 13 is moved downwardly or to its closed position. Of course, the piston may be retained in any intermediate position of adjustment according to the position desired for the flap 13. The piston 53 is held in position of adjustment by the liquid trapped within the cylinder 52 when the solenoid 55 is deenergized. At that time, the coil spring 48 is placed under tension so that when it is desired to raise the flap 13, this is accomplished by again energizing the solenoid 55 without operating the pump which creates the liquid pressure and thereby the coil spring 48 is allowed to swing the bell crank arms 39 and 40 in the opposite direction to the position shown in Figure 5.

Due to the action of the swinging regulator arms, it will be manifest that the channel bar 26 is moved either upwardly or downwardly in the pair of guide strips 28 which guide such vertical movement. It will further be apparent that such up and down movement is transmitted to the flexible closure flap 13 through the upwardly and rearwardly extending rods 17, the lower ends of which are rigid with the channel bar 26 and the upper ends of which are rigid with the metal strip 16 which is disposed in a pocket at the outer edge portion of the flap. As above pointed out, the rods 17 in their lowermost position, or in the closed position of the flap 13, are vertically disposed but as the rods 17 move upwardly, they incline rearwardly, such rocking motion being permitted between the buttons or studs on the outer ends of the regulator arms 39 and 40 and the retainer strips 42. As a consequence, the retainer strip may rock from one position to another, as shown in Figures 3 and 4, according to the angularity of the rods 17 with respect to the regulator mechanism. Such limited rocking motion is afforded due to the cooperative engagement between the buttons 41 and the retainer strips 42.

The operation of the regulator mechanism above described is controlled by a suitable switch (not shown) mounted in a position convenient to the driver as, for example, on the instrument panel or the inside of the door, such switch controlling the motor operated pump for creating the hydraulic pressure and also controlling the solenoid valve unit 55.

Inasmuch as ordinarily the above described mechanism for actuating the flap 13 of the convertible top is employed in connection with a power operated top, specifically electrically powered, it is important that means be provided to militate against the lowering movement of the convertible top when the flap is in its raised or open position. Otherwise, damage to the top would ensue. For this purpose, a normally open electric switch 56a is carried by a bracket 57 substantially in the path of movement of the channel bar 26. From this switch extend leads 58 and 59 which form a part of the top operating electrical circuit. Since the switch 56a is normally in open position, the top can not be lowered or folded until the switch 56a is closed. In order to close the switch 56, a finger 60 suitably fixed to the under side of the channel bar 26 is adapted to engage the switch 56a as shown in Figure 4, when the flap is in closed position. Any suitable switch may be employed for this purpose.

From the above description, it will be manifest that I have produced a simple and practical mechanism for raising and lowering the rear flap of a convertible top in order not only to increase and promote the comfortable ventilation of the interior of the car when the convertible top is in its closed position, but also to greatly improve visibility. By installing the mechanism as above shown and described, it is fully concealed in back of the rear seat and occupies a minimum amount of space. By means of the switch 56a, it is not possible to lower the top while the flap is in its raised or partially raised position, thereby insuring that the top will not be damaged.

It is to be understood that numerous changes in details of construction, arrangement and operation may be effected without departing from the spirit of the invention especially as defined in the appended claims.

What I claim is:

1. In a convertible automobile body having a flexible top capable of being folded back into an inoperative position, a panel or flap at the rear end of the top and having a flexible body portion connected at its upper edge portion to the top so that the panel may be swung outwardly and upwardly, rod means at opposite end portions of the free edge of said panel, regulator mechanism for raising and lowering said rod means, said mechanism including a rectilinear bar connected to the ends of said rod means, means for guiding said bar to move in a vertically disposed plane, and regulator means engaging said bar for effecting vertical movements thereof.

2. In a convertible automobile body having a flexible top capable of being folded back into an inoperative position, a panel or flap at the rear end of the top and having a flexible body portion connected at its upper edge portion to the top so that the panel may be swung outwardly and upwardly, a stiffening member at the free end of said panel, a pair of rods fixed to said stiffening member and depending therefrom, said body being apertured to receive said rods, a bar connecting the lower ends of said rods, horizontally disposed guide retainers in said bar, a regulator having a pair of swinging arms engaging said retainers so that upon swinging movement of said arms upward or downward movement is imparted to said bar, and stationary means for guiding said bar in an up and down path.

3. In a convertible automobile body having a flexible top capable of being folded back into an inoperative position, a panel or flap at the rear end of the top and having a flexible body portion connected at its upper edge portion to the top so that the panel may be swung outwardly and upwardly, a stiffening member at the free end of said panel, a pair of rods fixed to said stiffening member and depending therefrom, said body being apertured to receive said rods, a bar connecting the lower ends of said rods, mounting means for said rods enabling same to move in a vertically disposed path within said body and thence upwardly and rearwardly to an inclined position when the panel is in its raised position, power means for actuating said rods including a pair of stationary upright guides and a bar connecting the ends of said rods, and a sliding connection between the ends of said bar and said guides.

4. The organization as claimed in claim 3, comprising regulator mechanism concealed in said body and having swinging arms engaging said bar for raising and lowering same, and an operative connection between said regulator and said bar enabling said bar to tilt during its upward and lowering movement thereby to enable said rods to assume a vertically disposed position within the body and a rearwardly inclined position when in raised position.

5. In a convertible automobile body, a flexible top capable of being folded back into an inoperative position, electrically controlled power means for actuating said top, a panel at the rear of the top and having a flexible body portion connected by its upper edge portion to the top so that the panel may be swung outwardly and upwardly, regulator mechanism for raising and lowering said panel, and means for militating against operation of said top when said panel is in its upwardly disposed position, said means including a normally open electrical switch for said power means engageable to be closed by said regulator mechanism when the panel is in closed position.

JOHN B. PARSONS.

(References on following page)

REFERENCES CITED

The following references are of record in the file of this patent:

UNITED STATES PATENTS

| Number | Name | Date |
|---|---|---|
| 709,913 | Lamb et al. | Sept. 30, 1902 |
| 1,894,527 | Yengst | Jan. 17, 1933 |
| 2,002,596 | Westrope | May 28, 1935 |
| 2,346,387 | Parsons | Apr. 11, 1944 |
| 2,371,183 | Parsons | Mar. 13, 1945 |
| 2,436,728 | Parsons | Feb. 24, 1948 |

FOREIGN PATENTS

| Number | Country | Date |
|---|---|---|
| 14,956 | Great Britain | May 10, 1906 |
| 250,452 | Great Britain | Apr. 15, 1926 |